(12) United States Patent
ElGafi

(10) Patent No.: US 6,391,080 B1
(45) Date of Patent: May 21, 2002

(54) PHOSPHATE, PHOSPHATIC FERTILIZERS MANUFACTURING PROCESS

(76) Inventor: Mohamed ElGafi, 3535 Hyland Ave., #202, Costa Mesa, CA (US) 92626

( * ) Notice: Subject to any disclaimer, the term of this patent is extended or adjusted under 35 U.S.C. 154(b) by 0 days.

(21) Appl. No.: 09/705,257

(22) Filed: Nov. 2, 2000

(51) Int. Cl.$^7$ .............................................. C05B 17/00
(52) U.S. Cl. .................................. 71/32; 71/38; 71/41
(58) Field of Search ................................ 71/32, 38, 41

(56) References Cited

U.S. PATENT DOCUMENTS 4,154,800 A  *  5/1979  Cannon et al. ............. 423/167
4,501,724 A  *  2/1985  Goers ........................ 423/320
4,714,600 A  * 12/1987  Driscoll et al. ............. 423/319

FOREIGN PATENT DOCUMENTS

PL              101814         *  2/1979

* cited by examiner

Primary Examiner—Chhaya D. Sayala

(57) ABSTRACT

The new process is a process designed to produce P2O5 (the basic component in phosphoric acid, phosphate chemicals and fertilizers) in the gas phase in lieu of the state of the art (liquid phase) wet process. The new process is much less polluting than the wet process and much more energy efficient.

2 Claims, No Drawings

PHOSPHATE, PHOSPHATIC FERTILIZERS MANUFACTURING PROCESS

BACKGROUND

Phosphoric acid is the backbone of all phosphate fertilizers and the production of phosphoric acid is the first step.

Phosphoric acid is produced by what is known as the wet process, in which sulfuric acid is added to the rock. This process is called the wet process(es). The wet processes include the dehydrate and the hemihydrate processes (hydrates of gypsum). All the wet processes are energy intensive and polluting to the environment. Typically, the wet process phosphoric chemical complex requires from one hundred to three hundred acres of acid ponds.

The new process overcomes this problem.

DESCRIPTION

In this invention, the P2O5 (phosphorus pentoxide) is produced from the phosphate rocks through a gas solid reaction (i.e. no water, no acid solution(s) is required). This is accomplished by treating the rocks with acid gases. (Example: SO3—sulfur trioxide) in any gas phase reactor. (Example: tranflow reactor). The reaction products will include P2O5 in the gas phase and calcium sulphate in the solid phase. P2O5 can be recovered by absorption by acid/chemical solutions, or any other recovery means, depending on the final product desired.

The new invention is a:

1) Process in which gases are utilized to produce P2O5 from phosphate rocks.
2) In the new invention/process, the produced P2O5 can be recovered by phosphoric acid solution.
3) In the new invention, the produced P2O5 can be recovered by water or a chemical solution containing other fertilizers, and/or animal feed supplement chemicals.

What is claimed is:

1. A method of producing phosphorous pentoxide ($P_2O_5$) from phosphate rocks consisting of 1) treating said rocks with an acid-gas in a gas-solid reaction to produce $P_2O_5$ in the gas phase and calcium sulfate in the solid phase and 2) recovering $P_2O_5$ by absorbing it in water, an acid solution or a chemical solution containing fertilizers or animal feed supplements.

2. The method of claim 1 wherein the acid gas is sulfur trioxide.

* * * * *